US006621636B2

(12) United States Patent
Tanaka et al.

(10) Patent No.: US 6,621,636 B2
(45) Date of Patent: Sep. 16, 2003

(54) LASER IRRADIATION APPARATUS AND METHOD OF LASER IRRADIATION

(75) Inventors: Koichiro Tanaka, Kanagawa (JP); Setsuo Nakajima, Kanagawa (JP); Takehito Yagi, Kanagawa (JP); Mikito Ishii, Kanagawa (JP); Kenichiro Nishida, Saitama (JP); Norihito Kawaguchi, Tokyo (JP); Miyuki Masaki, Tokyo (JP); Atsushi Yoshinouchi, Chiba (JP)

(73) Assignees: Semiconductor Energy Laboratory Co., Ltd. (JP); Ishikawajima-Harima Heavy Industries, Co. (JP)

( * ) Notice: Subject to any disclaimer, the term of this patent is extended or adjusted under 35 U.S.C. 154(b) by 0 days.

(21) Appl. No.: 10/026,340

(22) Filed: Dec. 21, 2001

(65) Prior Publication Data

US 2002/0080497 A1 Jun. 27, 2002

(30) Foreign Application Priority Data

Dec. 26, 2000 (JP) ......................... 2000-396317

(51) Int. Cl.[7] .............................................. G02B 27/10
(52) U.S. Cl. ...................................................... 359/618
(58) Field of Search ................... 359/618, 619, 359/628, 621, 622, 623, 624, 625, 626

(56) References Cited

U.S. PATENT DOCUMENTS 5,631,736 A * 5/1997 Thiel et al. .................. 356/486
5,706,094 A * 1/1998 Maris ........................... 372/23
6,172,820 B1 * 1/2001 Kuwahara ............... 372/29.015
6,249,381 B1 * 6/2001 Suganuma ............. 219/121.67
6,304,385 B1 * 10/2001 Tanaka ....................... 359/618
2001/0005606 A1   6/2001 Tanaka et al.
2001/0043321 A1 * 11/2001 Nishi et al. .................... 372/99
2002/0027716 A1 * 3/2002 Tanaka ......................... 359/621

FOREIGN PATENT DOCUMENTS

| JP | 6-005537  | 1/1994 |
| JP | 2000-021776 | 1/2000 |

OTHER PUBLICATIONS

1) English abstract re Japanese Patent Application No. 6-005537, published Jan. 14, 1994.
2) English abstract re Japanese Patent Application No. 2000-021776, published Jan. 21, 2000.

* cited by examiner

Primary Examiner—Hung Xuan Dang
(74) Attorney, Agent, or Firm—Cook, Alex, McFarron, Manzo, Cummings & Mehler, Ltd.

(57) ABSTRACT

A laser irradiation apparatus having a low running cost compared to the conventional, and a laser irradiation method using the laser irradiation apparatus, are provided. Crystal grains having a size in the same order as, or greater than, conventional grains are formed. The cooling speed of a semiconductor film is made slower, and it becomes possible to form crystal grains having a grain size in the same order as, or greater than, the size of grains formed in the case of irradiating laser light having a long output time to the semiconductor film. This is achieved by delaying one laser light with respect to another laser light, combining the laser lights, and performing irradiation to the semiconductor film in the case of irradiating laser light using a solid state laser as a light source, which has a short output time.

23 Claims, 15 Drawing Sheets

LASER IRRADIATION APPARATUS AND METHOD OF LASER IRRADIATION

BACKGROUND OF THE INVENTION

1. Field of the Invention

The present invention relates to a method of irradiating semiconductor films using laser light, and to a laser irradiation apparatus (apparatus containing a laser and an optical system for introducing laser light output from the laser to an irradiation subject) for performing irradiation of semiconductor films.

2. Description of the Related Art

Techniques for increasing crystallinity or performing crystallization by irradiating laser light to a semiconductor film formed on an insulating substrate such as glass have been widely researched in recent years. Silicon is often used in the semiconductor film. Means of crystallizing a semiconductor film by using laser light and obtaining a crystalline semiconductor film, is referred to as laser crystallization throughout this specification.

Compared to conventional synthetic quartz glass substrates that are in widespread use, glass substrates possess the advantages of having abundant workability at low cost, and of easily manufacturing a large surface area substrate. These are the reasons the aforementioned research is being carried out. Further, the use of lasers, preferably for crystallization, is due to the low melting point of glass substrates. Lasers are able to impart a high amount of energy to the semiconductor film only, without increasing the temperature of the substrate. Further, throughput is remarkably high in comparison with means of heat treatment using an electric furnace.

Crystalline semiconductors are made up of many crystal grains, and therefore are also referred to as polycrystalline semiconductor films. Crystalline semiconductor films formed by irradiating laser light, have high mobility, and therefore thin film transistors (TFTs) are formed using crystalline semiconductor films. For example, crystalline semiconductor films are utilized much in devices such as monolithic liquid crystal electro-optical devices in which pixel driver TFTs and driver circuit TFTs are manufactured on one glass substrate.

Further, a method in which pulse laser light such as an excimer laser having a high output is optically processed into a square spot of several centimeters per side, or into a linear shape having a length equal to or greater than 10 cm, and the laser light is then scanned (alternatively, the position of laser light irradiation is moved relative to the irradiation surface) and irradiated onto the surface, is good for mass production and is industrially superior. This method is therefore preferably used.

In particular, if a linear shape beam is used, laser irradiation can be performed on the entire irradiation subject by only scanning in a direction perpendicular to the longitudinal direction of the linear shape beam, differing from the case of using spot shape laser light in which forward and backward, and left and right scanning is necessary. Mass production is therefore good. The reason for scanning in a direction perpendicular to the longitudinal direction is because the scanning direction has the highest efficiency. In present methods of laser irradiation, the use of linear shape beams, in which pulse emission excimer laser light is processed by a suitable optical system, is gaining ground as a technique for manufacturing liquid crystal display devices using TFTs, due to its good mass production characteristics.

Semiconductor film crystallization after irradiating laser light to a semiconductor film is explained here. If laser light is irradiated to a semiconductor film, the semiconductor film will melt. However, the temperature of the semiconductor film drops as time passes, and crystal nuclei form. An almost countless number of uniform (or non-uniform) crystal nuclei are generated in the semiconductor film, and crystallization is complete after they nuclei grow. The position and size of the crystal grains obtained in this case, are random. Further, the crystal grain growth distance is known to be proportional to the product of the crystallization time and the growth speed. Here, the term crystallization time is the amount of time from when the crystal nuclei develop within the semiconductor film until crystallization of the semiconductor film is complete. If the amount of time from the melting of the semiconductor film until crystallization is complete is taken as melting time, the melting time increased, and the cooling speed of the semiconductor film is taken as being leisurely, then the crystallization time becomes long, and crystal grains having a large grain size can be formed.

There are several different types of laser light, but in general, laser crystallization utilizing laser light having a pulse emission excimer laser (hereafter referred to as excimer laser light) is used. Excimer lasers have the advantages of high output, and the capability of repeated irradiation at high frequency, and in addition, excimer laser light has the advantage of a high absorption coefficient with respect to silicon films.

KrF (wavelength 248 nm) and XeCl (wavelength 308 nm) are used as excitation gases in excimer lasers. However, Kr (krypton) and Xe (xenon) gasses are extremely high cost, and if the frequency of gas replacement becomes high, this invites an increase in manufacturing costs.

Further, it is necessary to replace parts such as a laser tube for performing laser emission, and a gas purification apparatus for removing unnecessary compounds generated in the process of emission, on a 2 to 3 year basis. These attached parts are often expensive, and this also invites a problem of increased manufacturing costs.

Laser irradiation devices using excimer laser light possess high performance, as stated above, but require an extreme amount of efforts for maintenance. In addition, they also possess the disadvantage of high running cost when used as mass production laser irradiation devices (the term running cost meaning costs that develop along with operation).

In order to realize a laser irradiation apparatus having a low running cost compared with an excimer laser, and to realize a laser irradiation method using the laser irradiation apparatus, a method of using a solid state laser (a laser which outputs laser light with crystal rods as resonance cavities) can be used.

However, the grain size of crystal grains formed in accordance with laser crystallization using a YAG laser, which is one typical solid state laser, is extremely small compared to crystal grains formed by laser crystallization using an excimer laser.

It is thought that one reason is that although solid state lasers have high output at present, the output time is extremely short. Methods such as LD (laser diode) excitation and flash lamp excitation exist as methods of solid state laser excitation. In order to obtain high output by LD excitation, it is necessary to have a large electric current flow in LD. The LD lifetime is therefore short and the cost is increased compared with flash lamp excitation. For this reason, almost all LD excitation solid state lasers are small output. High output lasers for use in mass production are still in a development state at present. On the other hand, flash lamp can output an extremely strong light, and therefore lasers excited by flash lamps have high power. However, atoms excited by energy introduced instantaneously are emitted all at once with emission by flash lamp excitation, and therefore the laser output time is extremely short. Thus, solid state lasers at present have high output, but their output time is extremely short. Consequently, it is difficult to form crystal grains by laser crystallization using a solid state laser that have a grain size which is in the same order as, or greater than, the grain size formed by performing laser crystallization using an excimer laser. Note that the term output time refers to the half width of one pulse within this specification.

SUMMARY OF THE INVENTION

An object of the present invention is to provide a laser irradiation apparatus having low running cost in comparison with conventional laser irradiation apparatuses. In addition, an object of the present invention is to provide a laser irradiation apparatus for forming crystal grains having a grain size which is on the same order as, or is greater than, that of conventional crystal grains in a method of laser irradiation using the laser irradiation apparatus.

In order to form crystal grains having a grain size that is in the same order as, or is greater than, the grain size of crystal grains formed in accordance with laser crystallization using an excimer laser, first calculations are performed relating to temperature changes during irradiation of a semiconductor film by an excimer laser. Temperature versus time at points A to C in FIG. 3 was calculated for irradiation of excimer laser light to a silicon film made from the structure shown in FIG. 3. The output time of the laser light is taken as 27 ns here, and the energy density is set from 0.1 to 0.5 J. Results are shown in FIGS. 7A to 7G. It can be seen from FIGS. 7A to 7G that the crystallization time and the melting time become longer with increasing energy density, and that the cooling speed becomes slower. Further, it can be seen that a change in the temperature of the point A follows the temperature of point C.

Slowing down the cooling speed of the semiconductor film can be given as one effective means for forming large size crystal grains. Specifically, a method in which the laser light output time is made longer, and the semiconductor film melting time is also lengthened.

Calculations relating to temperature change when lengthening the output time of a YAG laser and performing irradiation to a semiconductor film were then performed. As shown in FIG. 3, laser light from a YAG laser is irradiated to a silicon film having a film thickness of 50 nm and formed on a silicon oxide film, and temperature versus time is calculated in the silicon film surface (the point A), in the interface between the silicon film and the silicon oxide film (the point B), and in the silicon oxide film at a distance of 100 nm below the interface (the point C). The temperature at which the silicon film melts is set at 1200 K here. Results are shown in FIGS. 4A through 6F. The output time was set to 6.7 ns and the energy density was set from 0.15 to 0.4 J in FIGS. 4A to 4D. In FIGS. 4E to 4H, the output time is set to 20 ns and the energy density was from 0.2 to 0.5 J. The output time was set to 27 ns for FIGS. 5A to 5D, and to 50 ns in FIGS. 5E to 5H, with the energy density varying form 0.2 to 0.5 J. In FIGS. 6A to 6C, the output time was set to 100 ns and the energy density was set form 0.3 to 0.5 J, while the output time was set to 200 ns in FIGS. 6D to 6F, with an energy density varying from 0.4 to 0.6 J.

The temperature of the points A to C increased due to irradiation of laser light, and after maintaining a first fixed temperature, there is an additional increase and a maximum temperature is achieved. It can be seen that the temperature of the points A to C then drops, and a second fixed temperature is maintained, and that there is a tendency to have an additional drop in temperature. The calculations were performed with the melting temperature of the silicon film taken as 1200 K, and therefore the silicon film is melted at the first fixed temperature, while solidification of the silicon film (crystallization) occurs at the second temperature. The time from the start of the second fixed temperature until the completion time corresponds to the crystallization time. The longer the crystallization time, the slower the cooling speed. Further, if the time from the beginning time of the first fixed temperature until the completion time of the second fixed temperature is taken as the melting time of the silicon film, the amount of time until the highest temperatures in the points A to C are achieved increases and the melting time becomes long with increasing output time at the same energy density. Namely, it can be said that the cooling speed of the semiconductor film becomes more relaxed with increasing output time.

Furthermore, the temperature of the silicon oxide film versus the laser light output time when crystallization begins is shown in FIG. 12. From FIG. 12 it can be seen that the temperature of the silicon oxide film at the beginning of crystallization increases with lengthening output time. In addition, the temperature of the silicon oxide film drops rapidly when the laser light output time is equal to or less than 50 ns. In other words, it is effective to increase the temperature of the base film in order to extend the amount of melting time for the semiconductor film.

The crystallization time and the melting time thus become longer, and the cooling speed of the semiconductor film thus becomes slower, with lengthening output time. The density of crystal nuclei generated becomes low, and the crystallization time becomes long; large size crystal grains can thus be formed. In other words, lengthening the output time is an effective means of making the crystal grains large.

However, as already discussed, solid state lasers at present have high output, but their output time is extremely short. For example, the output time of the model L4308 XeCl excimer laser (wavelength 308 nm) from Lambda Physic Corporation is 27 ns, while the output time of the DCR-3D Nd:YAG laser (wavelength 532 nm) of Spectra Physic Corporation is from 5 to 7 ns.

The present invention provides a laser irradiation apparatus, and a laser irradiation method, for forming crystal grains when irradiating a semiconductor film with laser light having a short output time using a solid state laser (a laser that outputs laser light using crystal rods as resonance cavities) as a light source, the grain size of which is in the same order as, or greater than, the grain size achieved for a case of irradiating a semiconductor film using laser light having a long output time. This result is achieved by forming a lag in other laser light, and irradiating the other laser light to the semiconductor film, making the cooling speed of the semiconductor film slower.

It is preferable that the laser light be formed into a linear shape by an optical system at this point. Note that the term formation of laser light into a linear shape refers to processing laser light such that it will have a form, which is linear on an irradiation surface. In other words, the cross sectional shape of the laser light is formed into a linear shape. Further, the term linear shape does not refer to the strict meaning of line, but refers to a rectangular shape (or elliptical shape) having a large aspect ratio. For example, this indicates an aspect ratio equal to or greater than 10 (preferably between 100 and 10,000).

In general, known solid state laser can be used as the solid state laser; lasers such as YAG lasers (normally indicating Nd:YAG lasers), Nd:YLF lasers, Nd:YVO$_4$ lasers, Nd:YAlO$_3$ lasers, ruby lasers, Ti:sapphire lasers, and glass lasers can be used. In particular, it is preferable to use a YAG laser, which has superior coherency and pulse energy.

Note that the fundamental harmonic (the first harmonic) has a long wavelength of 1064 nm, and therefore it is preferable to use the second harmonic (wavelength 532 nm), the third harmonic (wavelength 355 nm), or the fourth harmonic (wavelength 266 nm). These harmonics can be obtained by using nonlinear crystals.

The first harmonic can be modulated into the second harmonic, the third harmonic, or the fourth harmonic by using a wavelength modulator containing nonlinear elements. Formation of each harmonic may be performed according to known techniques. Further, the term laser light from a solid state laser as a light source includes not only the first harmonic, but also second harmonics, third harmonics, and fourth harmonics which wavelengths are modulated into.

Furthermore, a Q switch method (Q modulation switch method) often used by YAG lasers may also be used. This is a method for pulse laser output in which the energy value has an extremely precipitous rise due to suddenly increasing the Q value from a state in which the Q value of the laser resonance apparatus is sufficiently low. This is a known technique.

The solid state laser used by the present invention is basically capable of outputting laser light provided that a solid state crystal, a resonance mirror, and a light source for exciting the solid state crystal are present, and therefore there is very little maintenance time and effort compared to excimer lasers. Namely, the running cost is extremely low compared to that of an excimer laser, and therefore it becomes possible to greatly lower the manufacturing costs of semiconductor devices. Further, the availability ratio of a mass production line is increased if the amount of maintenance decreases, and therefore the overall throughput in the manufacturing process increases. This also greatly contributes to a reduction in the manufacturing costs of semiconductor deices. In addition, the surface area occupied by the solid state laser is small compared to that occupied by excimer lasers, and this is advantageous in design of the manufacturing line.

With the present invention, the cooling speed of a semiconductor film during laser crystallization using laser light having a short output time is made slower. This is accomplished by irradiating a plurality of laser lights in which time differences are formed. The amount of time allowed for crystal growth is increased by this crystallization process, and as a result, the size of the crystal grains formed becomes larger.

DETAILED DESCRIPTION OF THE PREFERRED EMBODIMENTS

Embodiment Mode 1

One embodiment mode of the present invention is explained.

Figure 1:
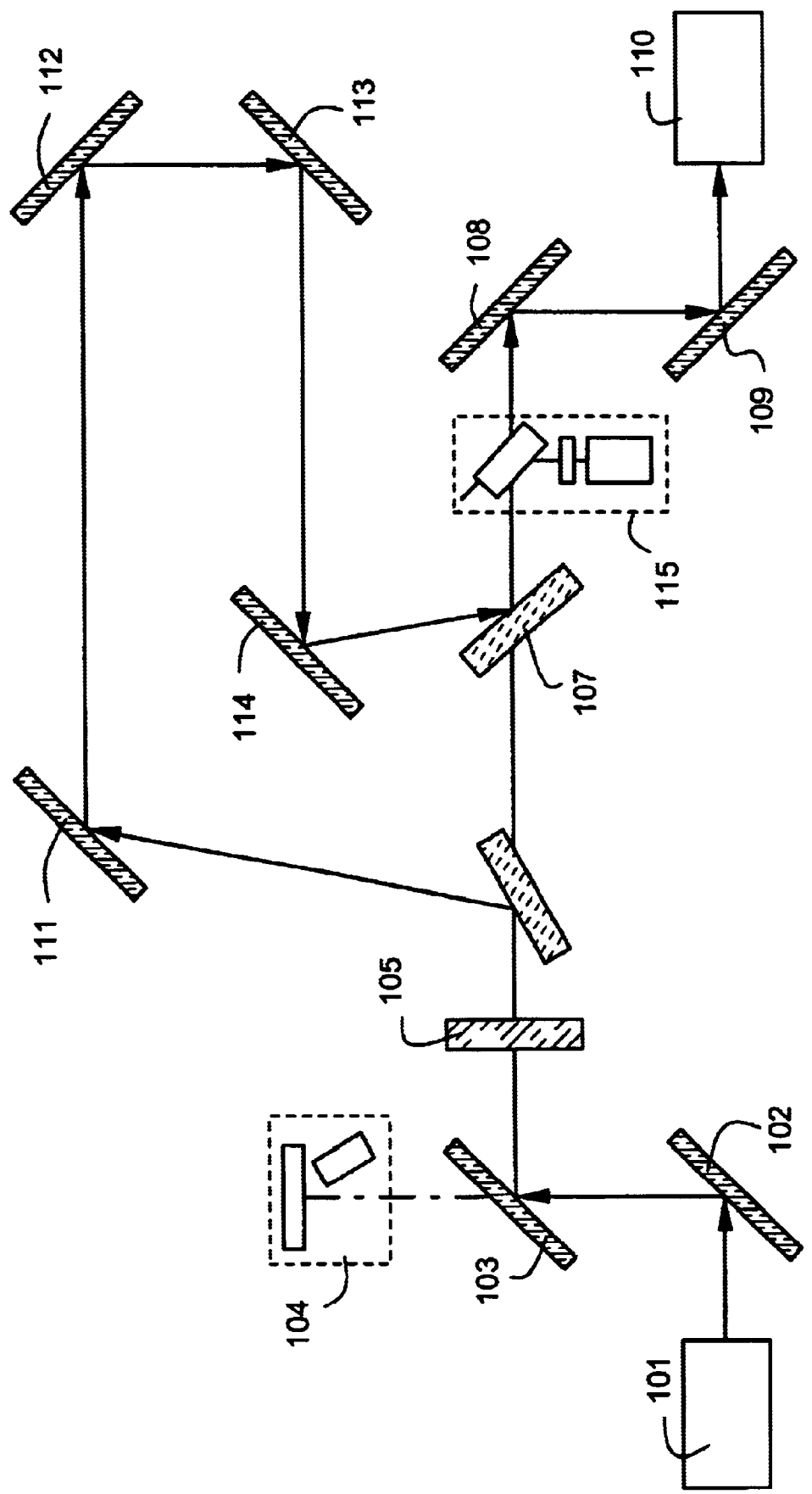
FIG. 1 is a diagram showing an example of a structure of a laser irradiation apparatus.

FIG. 1 is a diagram showing an example of a structure of a laser irradiation apparatus of the present invention. The laser irradiation apparatus has a solid state laser oscillator 101, reflective mirrors 102, 103, 108, 109, and 111 to 114, a ë/2 plate 105, thin film polarizers (TFPs) 106 and 107, and an optical system 110 for processing laser light into a linear shape. Further, reference numeral 104 denotes an energy monitor system, and reference numeral 115 denotes a shutter system.

Laser light from the laser oscillator 101 is reflected by the reflective mirrors 102 and 103, and arrives at the ë/2 plate 105. By arranging the ë/2 plate 105 in the light path, the strength distribution ratio of beams separated by the TFP can be arbitrarily changed.

Provided that the TFP 106 is arranged so that the angle of incidence of the laser light becomes the Brewster angle, the amount of reflected light from the laser light having p components becomes zero (components in which the electric field vector oscillates within the plane of incidence (a plane determined by the incident light rays and the line normal to incidence)). The p components of the laser light therefore pass through the TFP, and only the s components of the laser light (components in which the electric field vector oscillates within a plane vertical to the plane of incidence) are reflected. The p components of the transmitted laser light are irradiated on a substrate via the reflective mirrors 108 and 109, and the optical system 110.

On the other hand, the s components of the reflected laser light are reflected by the TFP 107, arranged so that the angle of incidence becomes the Brewster angle, after passing through the reflective mirrors 111 to 114, and are irradiated to the substrate via the reflective mirrors 108 and 109, and the optical system 110. By passing the s components of the laser light through the reflective mirrors 111 to 114, a light pass length of only the s components of the laser light is lengthened, and a light path difference with the p components of the laser light that have passed through the TFP 106 is obtained. A difference in time equal to the value of the lengthened light path length divided by the speed of light is thus formed between the s components and the p components when the laser light is irradiated to the substrate. Namely, when one laser pulse is separated into two pulses and a light path difference is formed in one pulse, that pulse can be delayed longer than the other pulse during irradiation of a substrate, and the cooling speed of a semiconductor film can be made slower. The density of nuclei generated therefore becomes lower, the crystallization time becomes longer, and consequently large size crystal grains can be formed.

Laser light is separated into the polarization components of the laser light, s components and p components, in embodiment mode 1. The s components and the p components are mutually independent components, and therefore interference does not occur when the components are combined together. This is therefore one separation method that is extremely effective in the case of using laser oscillators having high interference. Further, the combination method is simple in the case of combining s components and p components of laser lights emitted from different laser oscillators. For example, if a mirror 114 of FIG. 1 is replaced by another laser oscillator, the respective laser lights can be combined.

Note that although one laser light is divided into two in embodiment mode 1, the number of divisions is not limited to two, provided that there is a plurality of divisions. Further, the energy densities of each of the divided pulses do not have to be the same. It is possible to change the energy density by the ë/2 plate 105. For example, the melting time becomes longer in the case in which the energy density of the first pulse of laser light has a laser light energy density greater than that of subsequent pulses, and therefore the cooling speed can be slowed. Furthermore, the semiconductor film is heated by the first pulse of laser light in the case in which the energy density of the laser light of the second pulse, and subsequent pulses, is greater than the energy density of the first pulse. An additional increase in grain size can thus be expected. Optimal values for the additional light path length and the number of laser light divisions will differ depending upon factors such as the state of the semiconductor film and the type of laser oscillator.

Embodiment Mode 2

An embodiment mode differing from embodiment mode 1 is explained in embodiment mode 2. An example of a laser irradiation apparatus that uses a plurality of laser oscillators is shown in embodiment mode 2.

Figure 2:
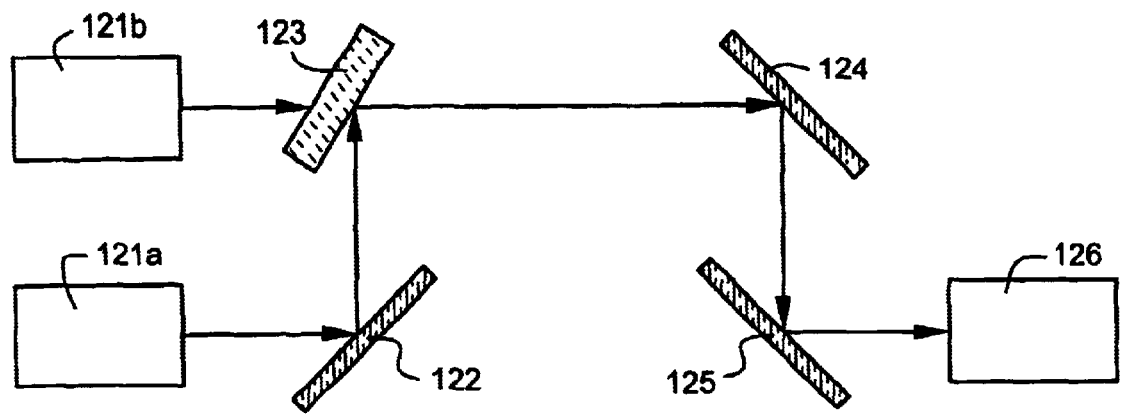
FIG. 2 is a diagram showing an example of a structure of a laser irradiation apparatus.

FIG. 2 is a diagram showing an example of a structure of a laser irradiation apparatus of the present invention. The laser irradiation apparatus has laser oscillators 121a and 121b, reflective mirrors 122, 124, and 125, a TFP 123, and an optical system 126 for processing laser light into a linear shape.

Laser light is emitted at the same time from the laser oscillators 121a and 121b. Although not shown in the figure, by using a TFP, a first laser light 1 emitted from the laser oscillator 121a is made to have only s components, and a second laser light 2 emitted form the laser oscillator 121b is made to have only p components. The laser light 1 is reflected by the reflective mirror 122, after which it arrives at the TFP 123. The laser light 2, on the other hand, arrives at the TFP 123 without going by way of reflective mirrors and the like. A light path difference is thus formed between the laser light 1 and the laser light 2 in accordance with the distance between the reflective mirror 122 and the TFP 123. A difference in time required to reach a substrate develops, and the cooling speed of a semiconductor film becomes slower. The density of crystal nuclei that develop therefore becomes lower, the crystallization time becomes longer, and large size crystal grains can be formed. Furthermore, the light path difference between the laser lights emitted from the laser oscillators 121a and 121b can be arbitrarily changed by changing the distance between the reflective mirror 122 and the TFP 123.

In addition, there is also a method for oscillating the laser oscillator 121a after oscillating the laser oscillator 121b by forming a device (not shown in the figure) for controlling laser oscillation, for example, when emitting laser light from the laser oscillators 121a and 121b. Compared to having simultaneous laser light emission from the laser oscillators 121a and 121b, light path differences between the reflective mirror 122 and the TFP 123 need not be formed with this method, resulting in a compact laser irradiation apparatus.

A combination method becomes easy in the case such as embodiment mode 2 in which s components and p components of laser light emitted from different laser oscillators are combined. Consequently, there is no need for a complex optical system, and this is extremely effective in optical regulation and in making the apparatus smaller.

Note that although two laser oscillators are used in embodiment mode 2, the number of laser oscillators is not limited to two, provided that a plurality of laser oscillators are used. The energy densities of the plurality of pulses also need not be the same. Further, optimal values for the additional light path length and the number of laser oscillators will differ depending upon factors such as the state of the semiconductor film and the type of laser oscillator.

Embodiment Mode 3

An embodiment mode differing from embodiment mode 1 and embodiment mode 2 is explained in embodiment mode 3. An example of a laser irradiation apparatus using a plurality of laser oscillators is shown in embodiment mode 3.

Figures 13, 14:
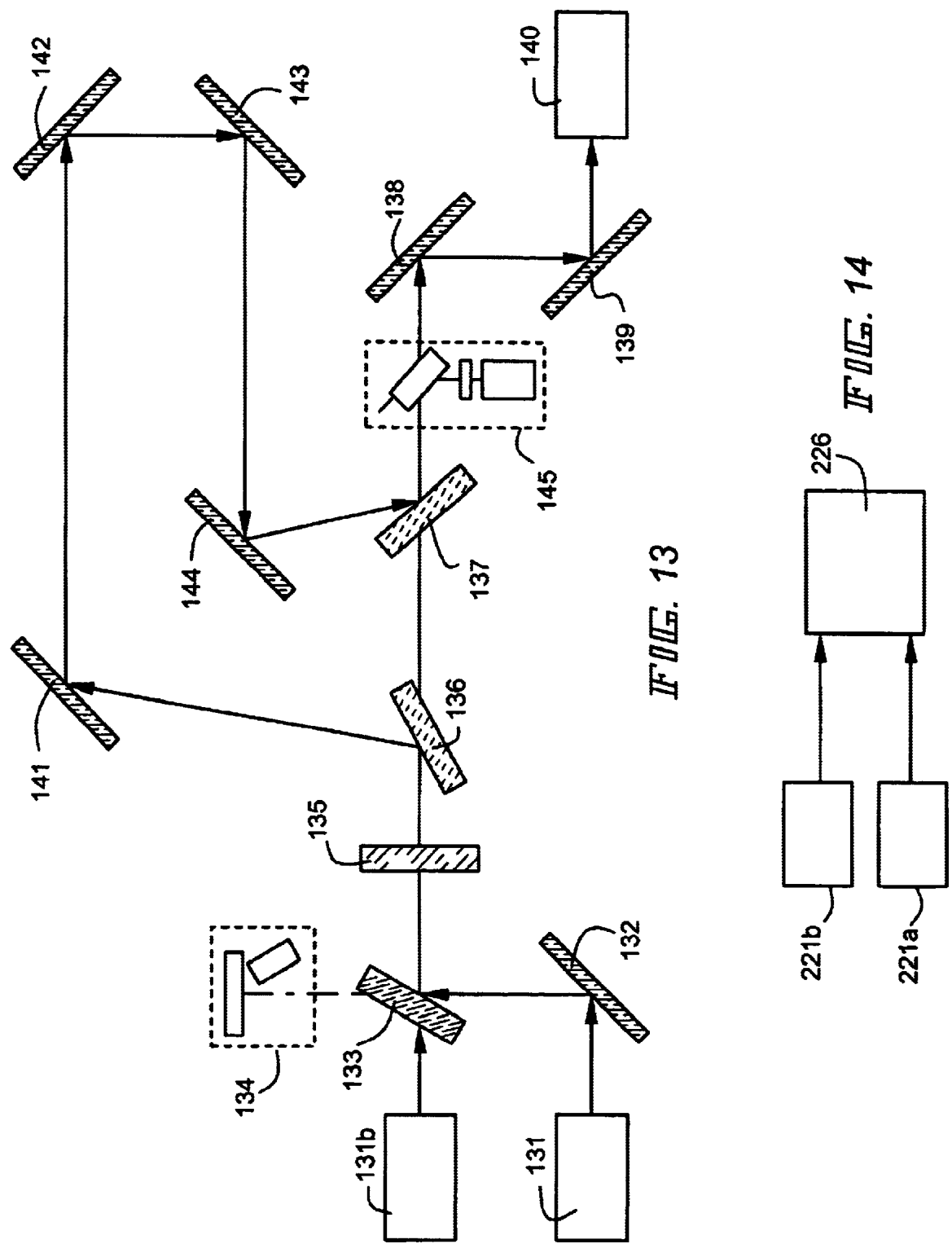
FIG. 13 is a diagram showing examples of laser irradiation apparatus structures.
FIG. 14 is a diagram showing examples of laser irradiation apparatus structures.

FIG. 14 is a diagram showing an example of a structure of a laser irradiation apparatus of the present invention. The laser irradiation apparatus has laser oscillators 221a and 221b, and an optical system 226 for processing laser light into a linear shape.

Laser light is emitted from the laser oscillators 221a and 221b and a difference in time is formed by a device (not shown in the figure) for controlling laser oscillation. The light path lengths from the laser oscillators 221a and 221b to the optical system 226 are the same, but the time for laser light emission differs, and therefore a difference in time develops for the light to reach a substrate and the cooling speed of a semiconductor film is slowed. The density of crystal nuclei that develop thus becomes less, and the crystallization time becomes longer. Large size crystal grains can therefore be formed. Furthermore, the difference in time for each of the laser lights to reach the substrate can be arbitrarily changed by changing the difference in time at which the laser oscillators 221a and 221b are oscillated.

There is no light path difference formed by increasing the light path length from at least one laser oscillator, from a plurality of laser oscillators, to the substrate in embodiment mode 3, and therefore the laser irradiation apparatus becomes compact.

Note that although two laser oscillators are used in embodiment mode 3, the number is not limited to two provided that a plurality of laser oscillators are used. The energy densities of the plurality of laser lights also need not be the same.

An additionally detailed explanation of the present invention, having the structures discussed above, is made using the following embodiments.

Embodiment 1

An embodiment of the present invention is explained.

FIG. 1 is a diagram showing an example of a structure of a laser irradiation apparatus of the present invention. The laser irradiation apparatus has the solid state laser oscillator 101, the reflective mirrors 102, 103, 108, 109, and 111 to 114, the ë/2 plate 105, the thin film polarizers (TFPs) 106 and 107, and the optical system 110 for processing laser light into a linear shape. Further, reference numeral 104 denotes the energy monitor system, and reference numeral 115 denotes the shutter system. A YAG laser is used as the solid state laser oscillator in embodiment 1, and the output time of the laser light having the YAG laser as an oscillation source is 6.7 ns.

Laser light from the laser oscillator 101 is reflected by the reflective mirrors 102 and 103, and arrives at the ë/2 plate 105. By arranging the ë/2 plate 105 in the light path, the strength distribution ratio of beams separated by the TFP 106 can be arbitrarily changed. The strengths of the two laser lights formed by division using the TFP 106 are made to be the same in embodiment 1.

Provided that the TFP 106 is arranged so that the angle of incidence of the laser light becomes the Brewster angle, the amount of reflected light from the laser light having p components, becomes zero (components in which the electric field vector oscillates within the plane of incidence). The p components of the laser light therefore pass through the TFP, and only the s components of the laser light (components in which the electric field vector oscillates within a plane vertical to the plane of incidence) are reflected. The p components of the transmitted laser light are irradiated on a substrate via the reflective mirrors 108 and 109, and the optical system 110.

On the other hand, the s components of the reflected laser light are reflected by the TFP 107, arranged so that the angle of incidence becomes the Brewster angle, after passing through the reflective mirrors 111 to 114, and are irradiated to the substrate via the reflective mirrors 108 and 109, and the optical system 110. By passing the s components of the laser light through the reflective mirrors 111 to 114, a light pass length of only the s components of the laser light is lengthened, and a light path difference with the p components of the laser light that have passed through the TFP 106 is obtained. A difference in time equal to the value of the lengthened light path length divided by the speed of light is thus formed between the s components and the p components when the laser light is irradiated to the substrate. Namely, when one laser pulse is separated into two pulses and a light path length becomes lengthened in one pulse, that pulse can be delayed longer than the other pulse during irradiation of a substrate, and the cooling speed of a semiconductor film can be made slower. The density of nuclei generated therefore becomes lower, the crystallization time becomes longer, and consequently large size crystal grains can be formed.

Further, a simulation was performed for the laser irradiation apparatus having the structure of embodiment 1 in which, after irradiating one of the pulses divided to a silicon film, the other pulses are given delays of 10, 20, and 30 ns and irradiated to the silicon film. It is known that delay time=lengthened light path length/speed of light and therefore in order to form delays of 10 ns, the light path length becomes $$10 \times 10^{-9} s \times 3 \times 10^8 \text{ m/s} = 3 \text{ m}.$$

In other words, the s components of the laser light are irradiated on the surface to be irradiated with a delay of 10 nm after the p components of the laser light provided that the difference between the light path length from the TFP 106 to the TFP 107 via the reflective mirrors 111 to 114 (the light path length taken by the s components of the laser light in embodiment 1), and the light path length from the TFP 106 to the TFP 107 (the light path length taken by the p components of the laser light in embodiment 1) in FIG. 1 is set to 3 m.

Figure 3:
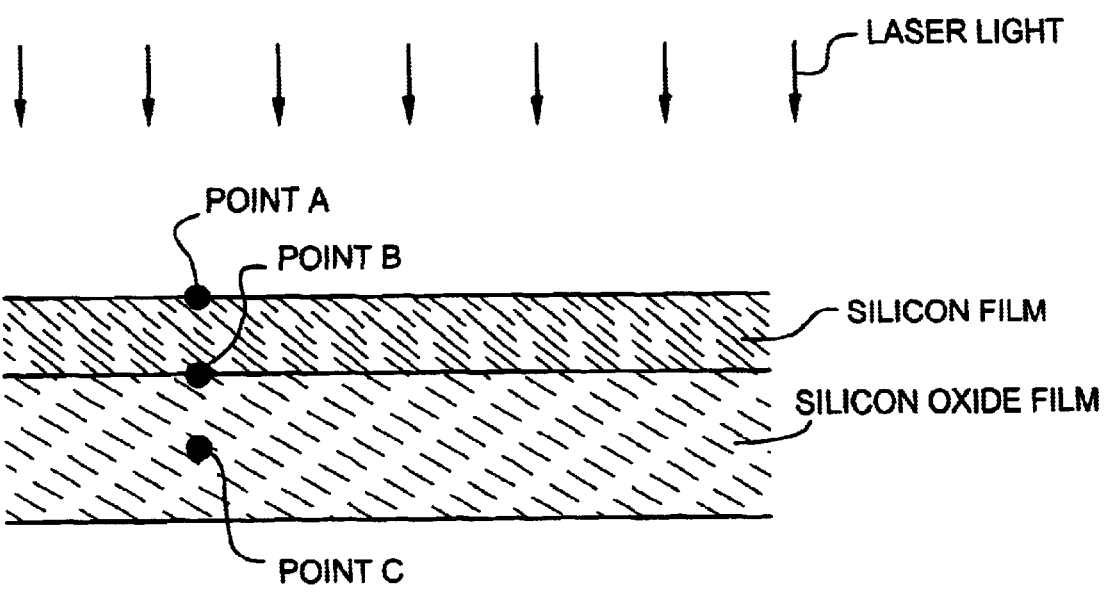
FIG. 3 is a diagram showing a structure of a semiconductor device film used in a simulation, and temperature measurement points.
Figure 4A:
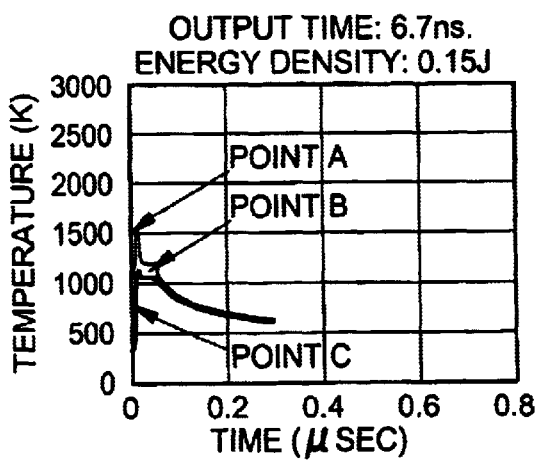
FIGS. 4A to 4D are diagrams showing temperature changes when a semiconductor film is irradiated by a YAG laser having an output time of 6.7 ns and an energy density between 0.15 and 0.4 J.
Figure 4B:
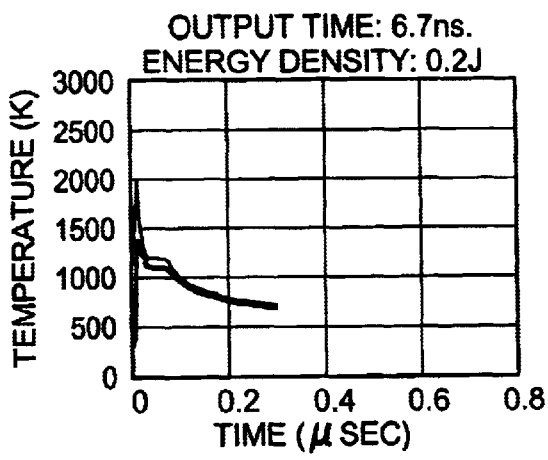
Figure 4C:
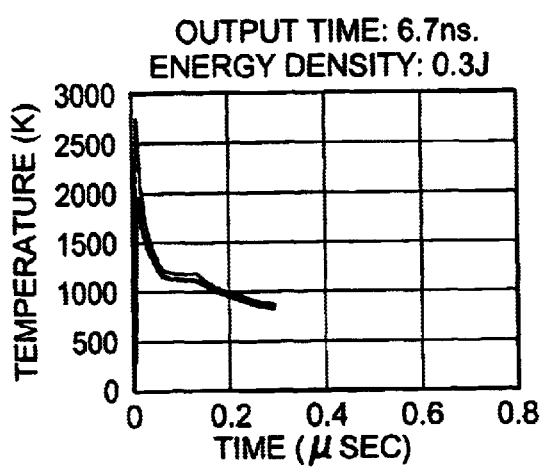
Figure 4D:
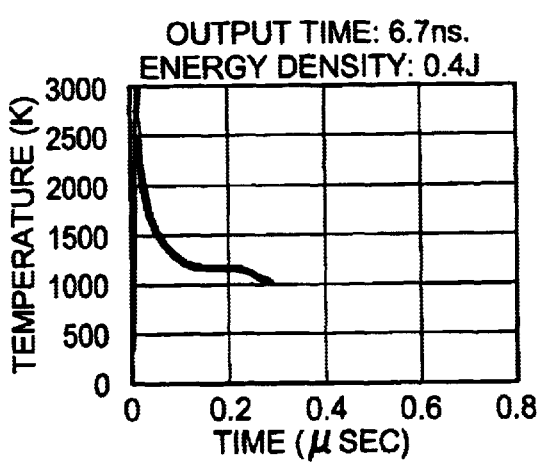
Figure 4E:
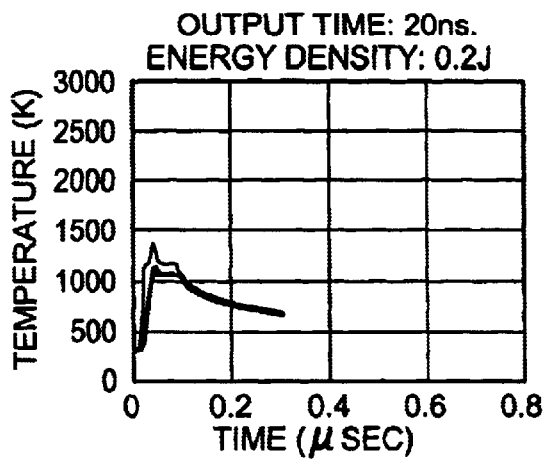
FIGS. 4E to 4H are diagrams showing temperature changes when a semiconductor film is irradiated by a YAG laser having an output time of 20 ns and an energy density between 0.2 and 0.5 J.
Figure 4F:
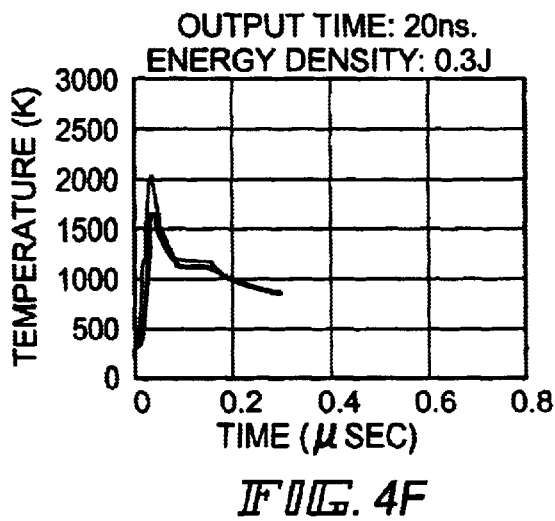
Figure 4G:
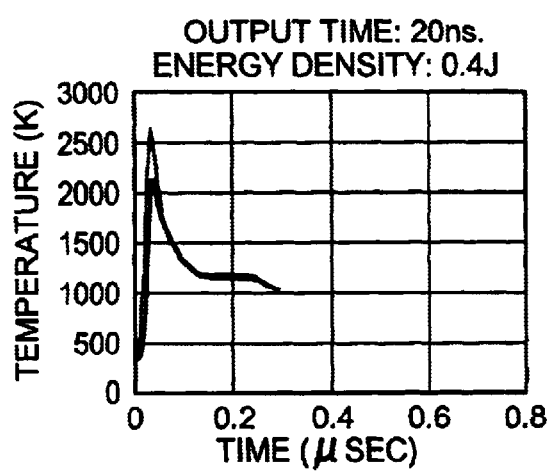
Figure 4H:
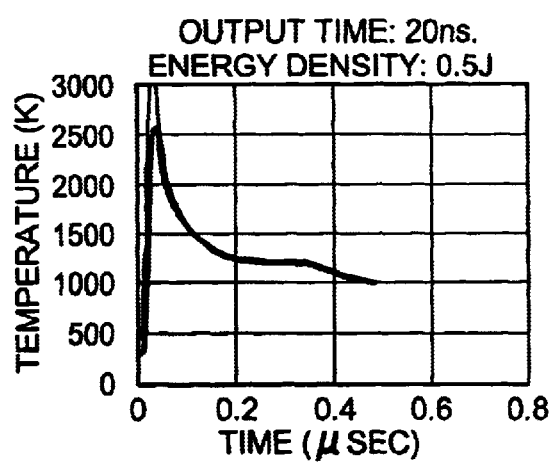
Figure 5A:
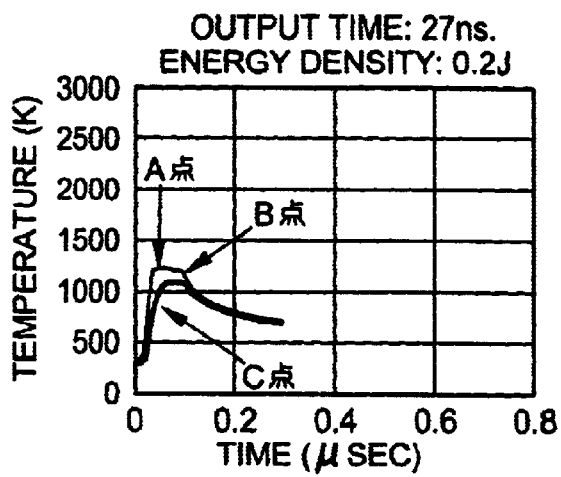
FIGS. 5A to 5D are diagrams showing temperature changes when a semiconductor film is irradiated by a YAG laser having an output time of 27 ns and an energy density between 0.2 and 0.5 J.
Figure 5B:
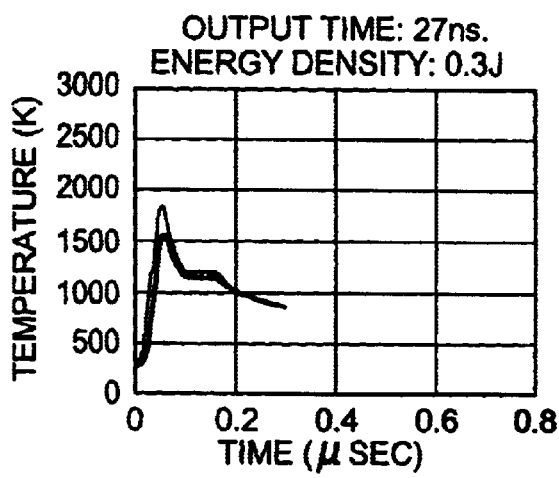
Figure 5C:
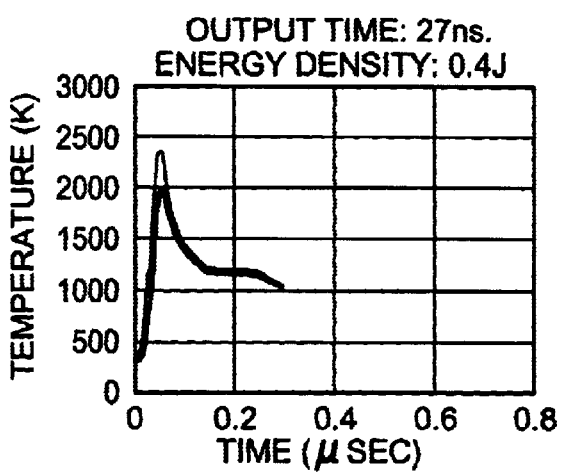
Figure 5D:
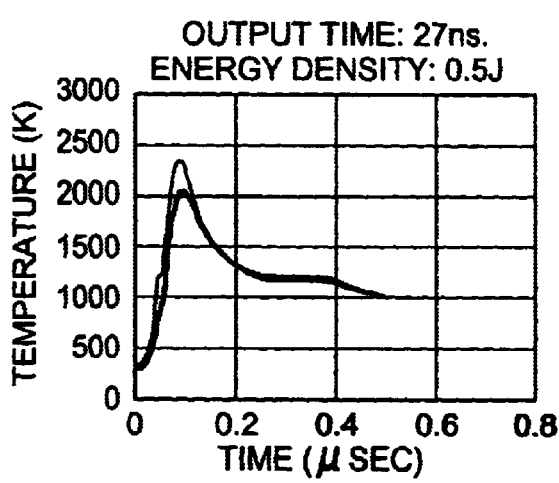
Figure 5E:
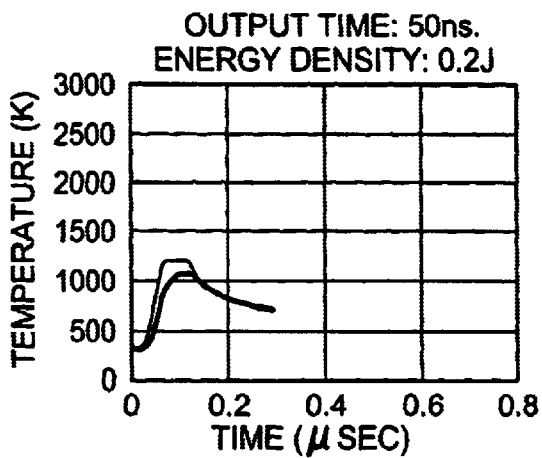
FIGS. 5E to 5H are diagrams showing temperature changes when a semiconductor film is irradiated by a YAG laser having an output time of 50 ns and an energy density between 0.2 and 0.5 J.
Figure 5F:
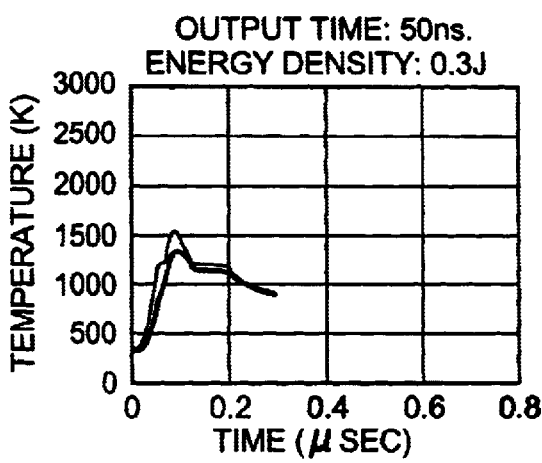
Figure 5G:
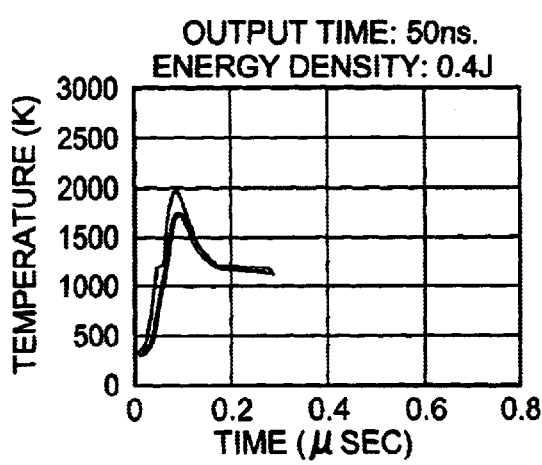
Figure 5H:
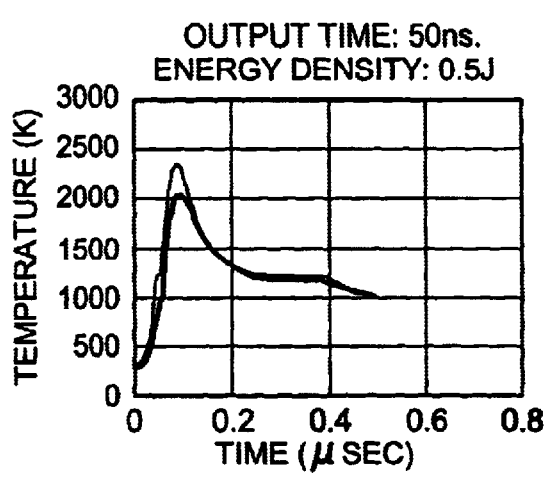
Figure 6A:
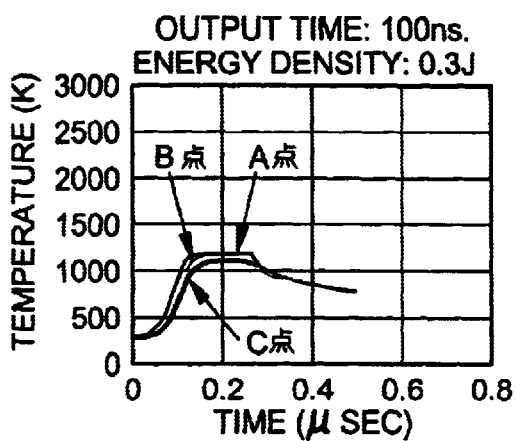
FIGS. 6A to 6C are diagrams showing temperature changes when a semiconductor film is irradiated by a YAG laser having an output time of 100 ns and an energy density between 0.3 and 0.5 J.
Figure 6D:
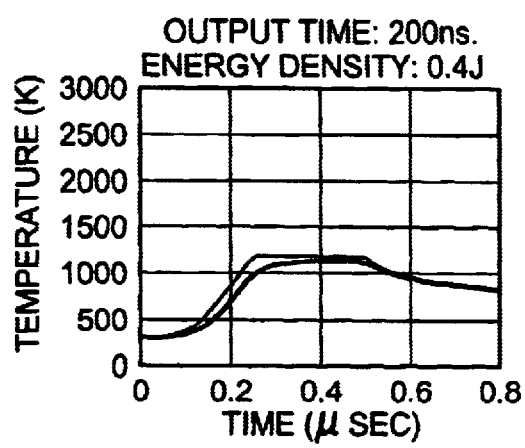
FIGS. 6D to 6F are diagrams showing temperature changes when a semiconductor film is irradiated by a YAG laser having an output time of 200 ns and an energy density between 0.4 and 0.6 J.
Figure 6B:
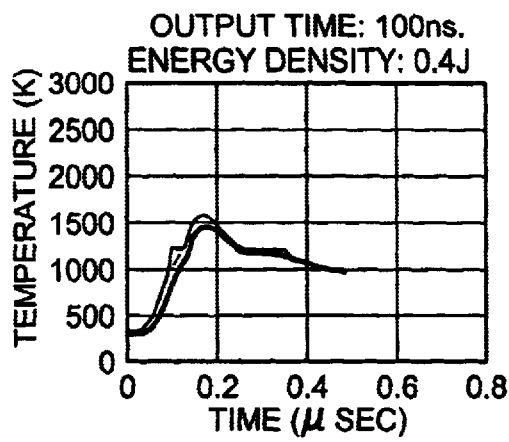
Figure 6E:
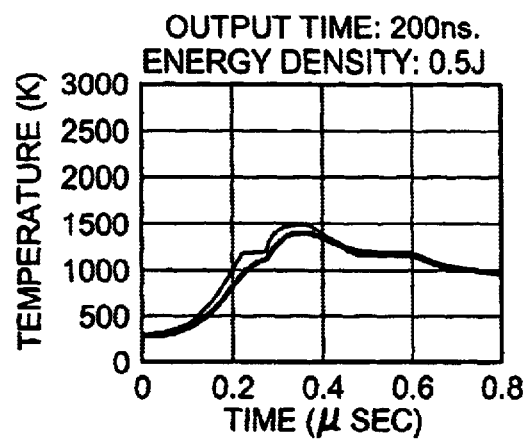
Figure 6C:
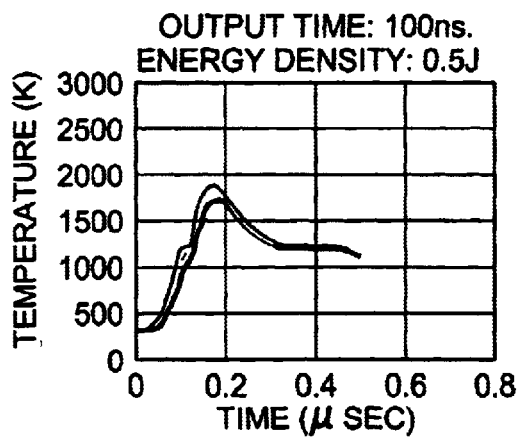
Figure 6F:
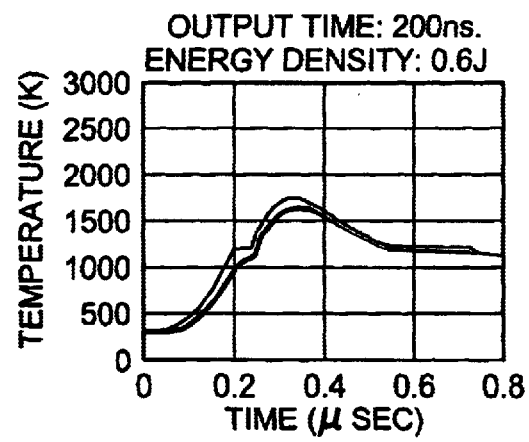
Figure 7A:
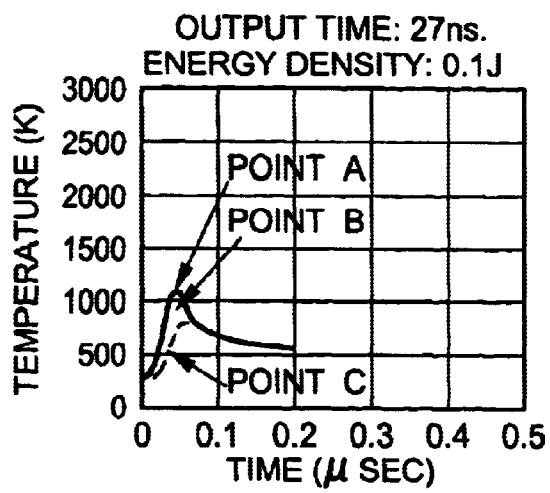
FIGS. 7A to 7G are diagrams showing temperature changes when a semiconductor film is irradiated by an excimer laser having an output time of 27 ns and an energy density between 0.1 and 0.5 J.
Figure 7B:
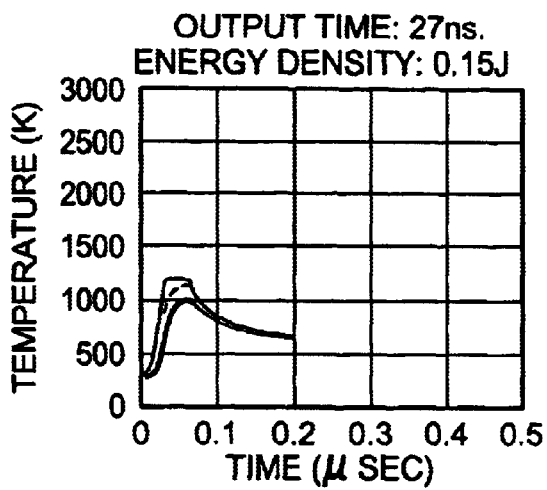
Figure 7C:
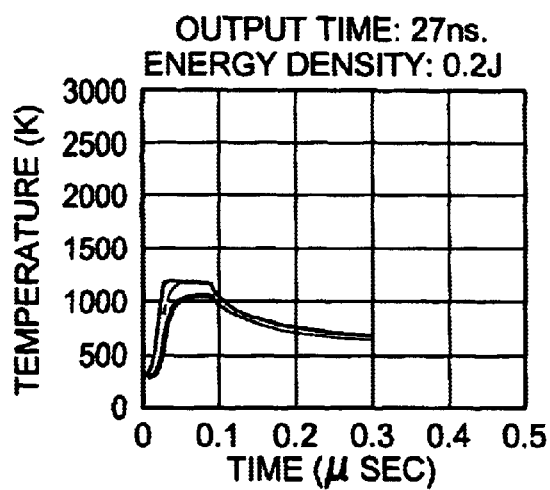
Figure 7D:
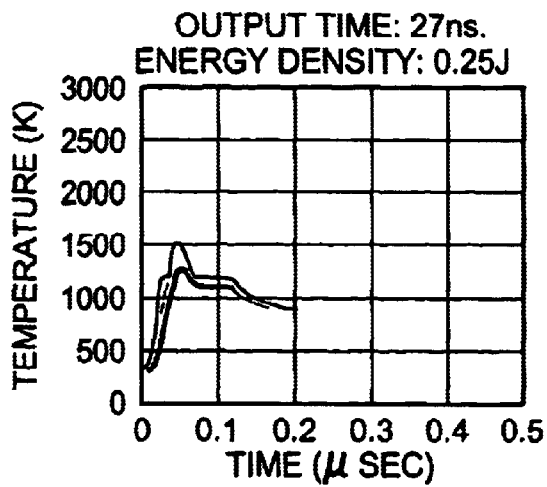
Figure 7E:
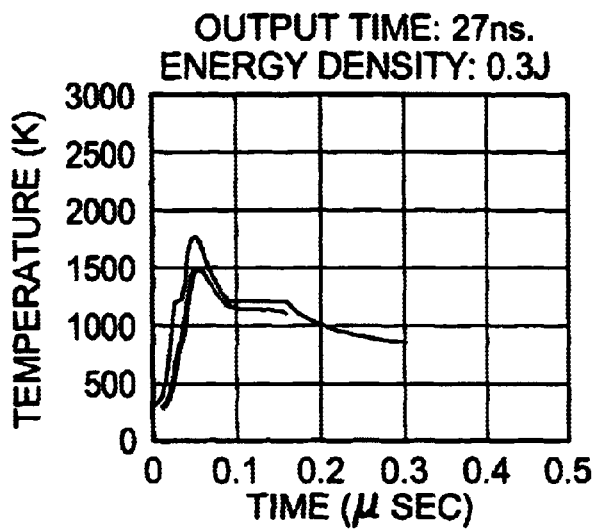
Figure 7F:
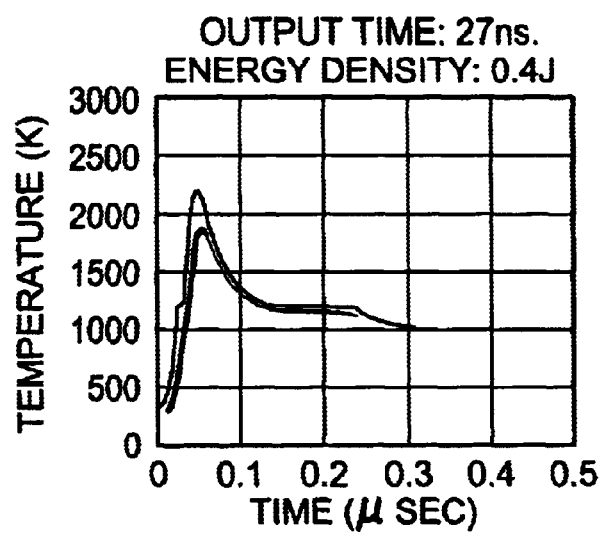
Figure 7G:
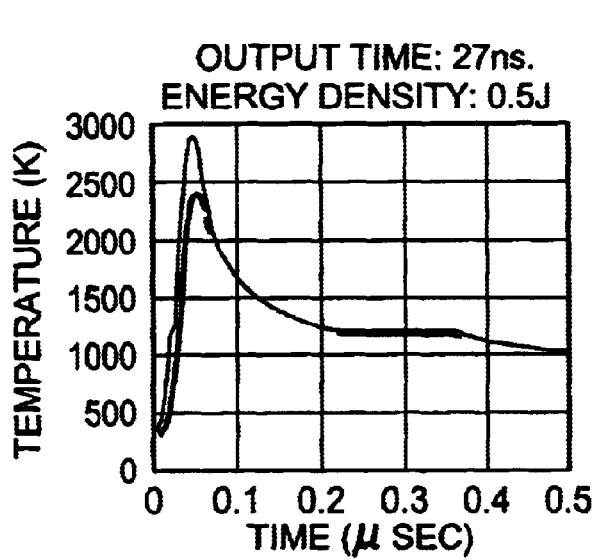
Figure 8A:
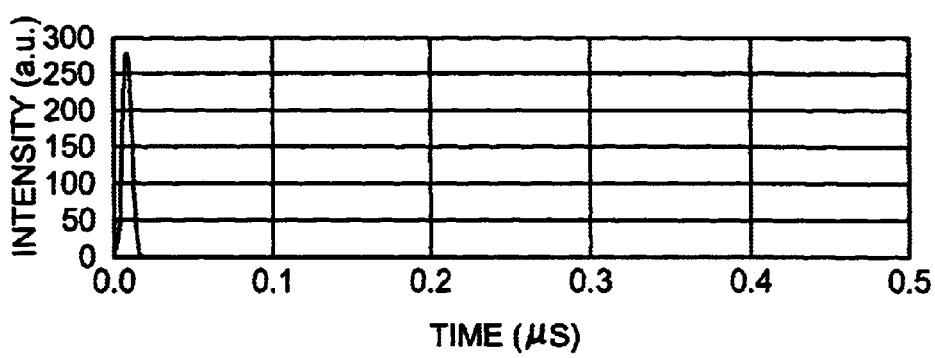
FIGS. 8A to 8D are diagrams showing pulse shapes of YAG lasers used in simulations.
Figure 8B:
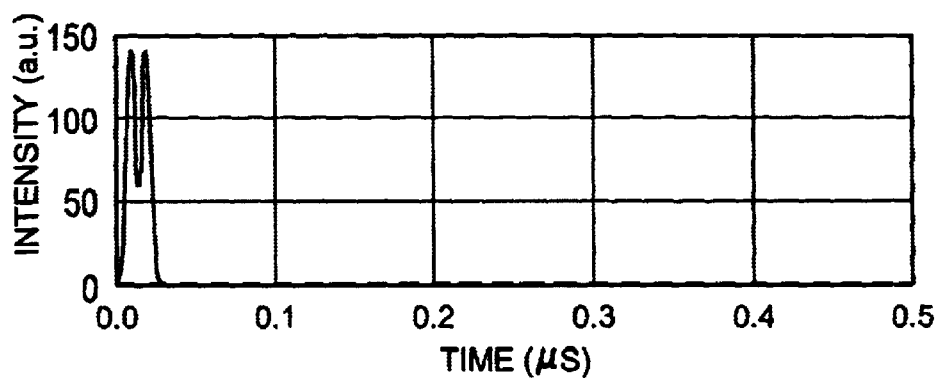
Figure 8C:
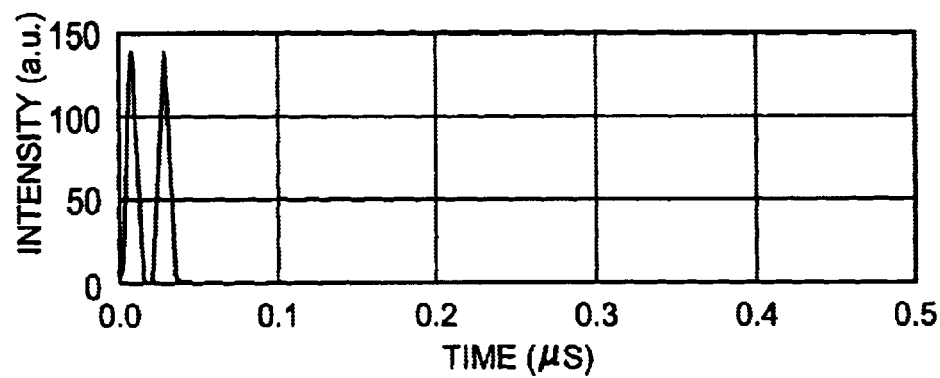
Figure 8D:
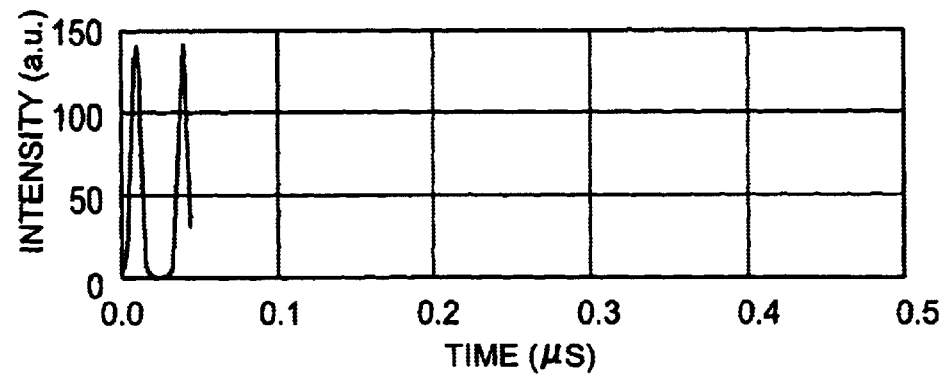
Figure 9A:
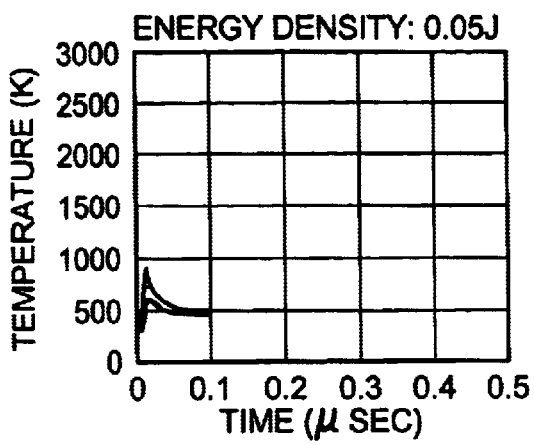
FIGS. 9A to 9F are diagrams showing temperature changes when a silicon film having the structure shown in FIG. 3 is irradiated by a YAG laser having the pulse shape shown by FIG. 8A and with an energy density from 0.05 to 0.4 J.
Figure 9D:
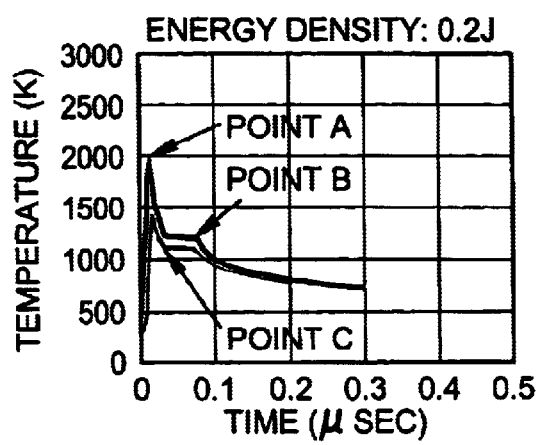
Figure 9B:
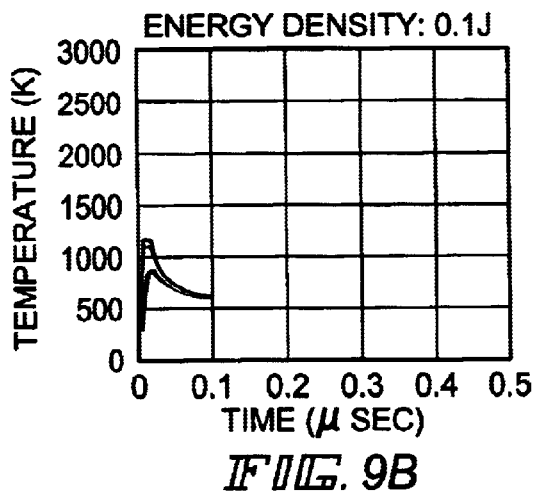
Figure 9E:
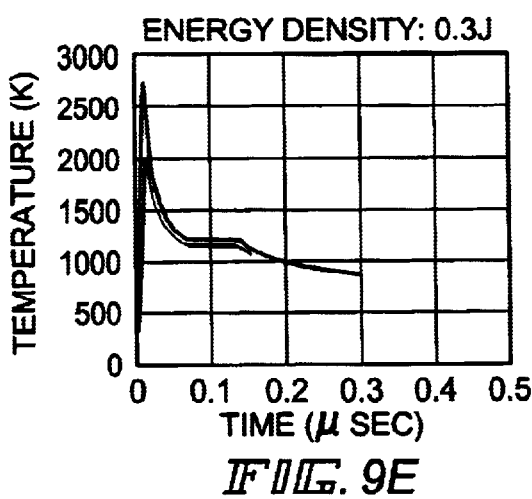
Figure 9C:
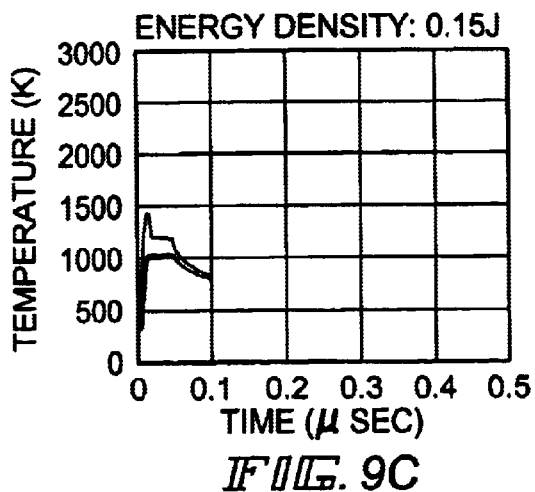
Figure 9F:
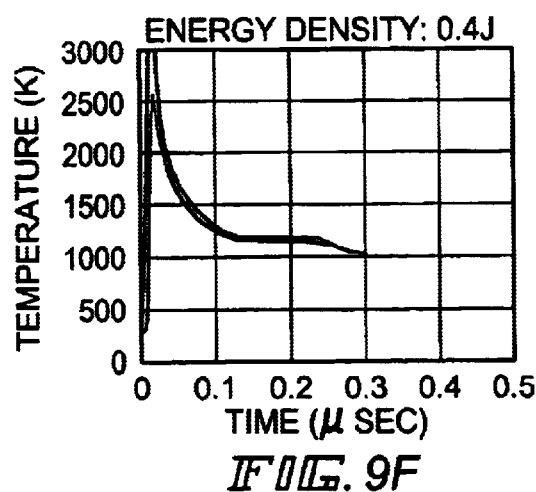
Figure 10A:
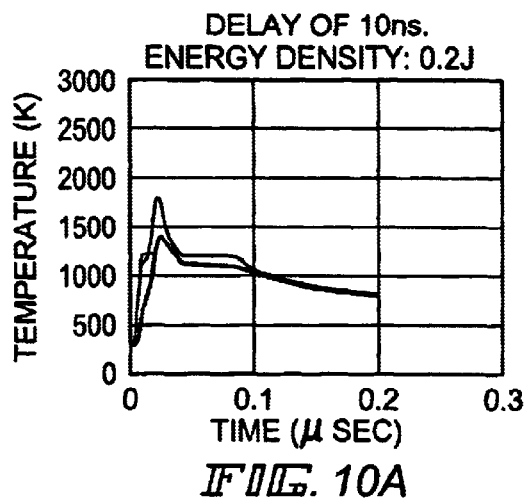
FIGS. 10A to 10C are diagrams showing temperature changes when a semiconductor film is irradiated by a YAG laser having an energy density of 0.2 to 0.4 J and divided into two pulses, one of which is delayed by 10 ns compared to the other pulse.
Figure 10D:
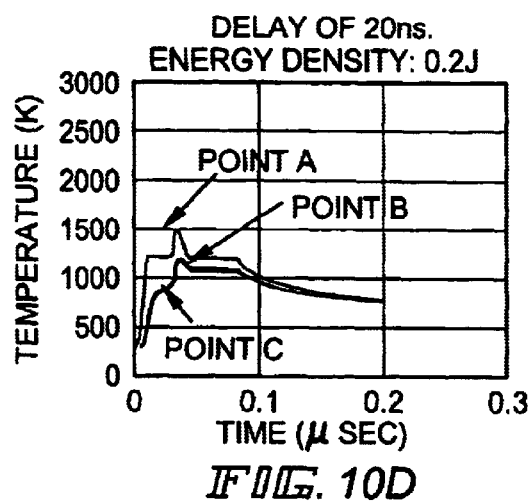
FIGS. 10D to 10F are diagrams showing temperature changes when a semiconductor film is irradiated by a YAG laser having an energy density of 0.2 to 0.4 J and divided into two pulses, one of which is delayed by 20 ns compared to the other pulse.
Figure 10B:
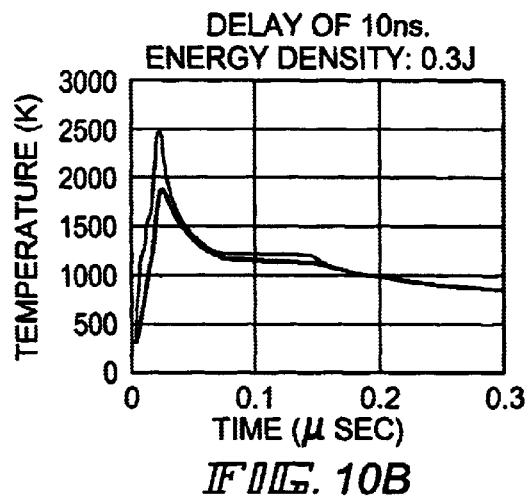
Figure 10E:
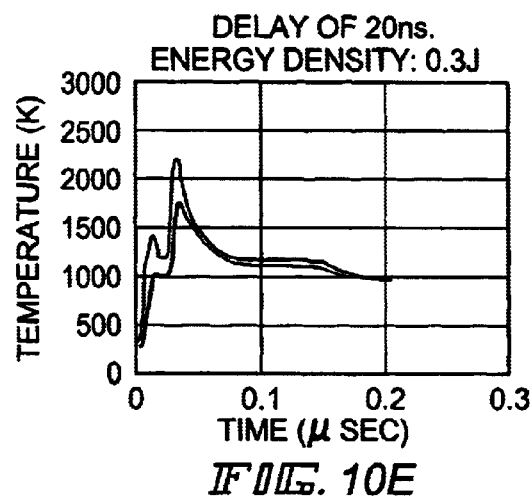
Figure 10C:
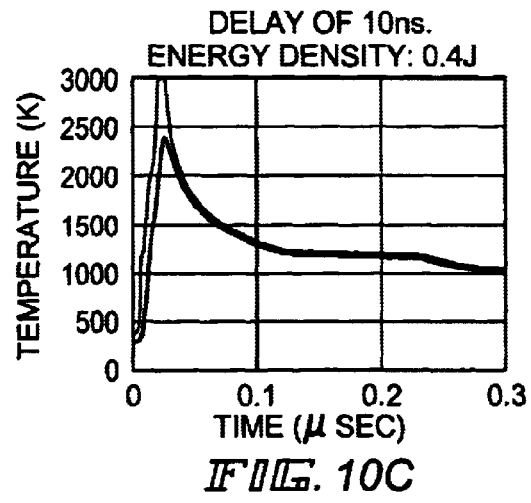
Figure 10F:
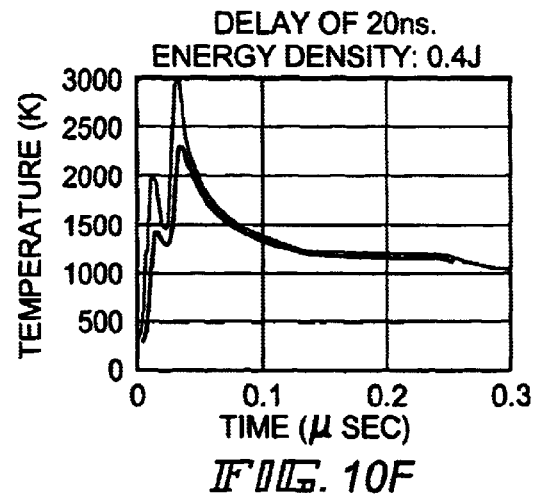
Figure 11A:
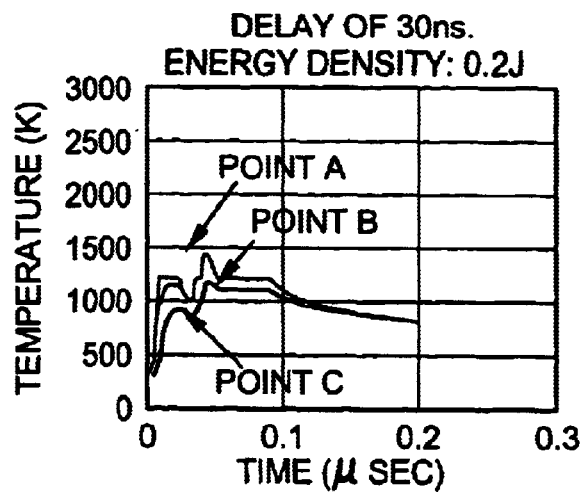
FIGS. 11A to 11C are diagrams showing temperature changes when a semiconductor film is irradiated by a YAG laser having an energy density of 0.2 to 0.4 J and divided into two pulses, one of which is delayed by 30 ns compared to the other pulse.
Figure 11B:
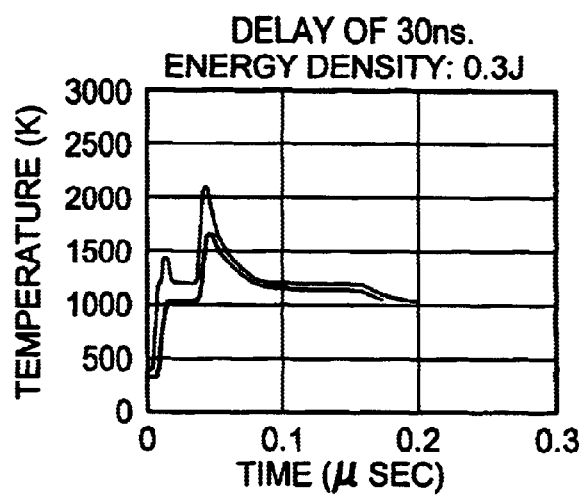
Figure 11C:
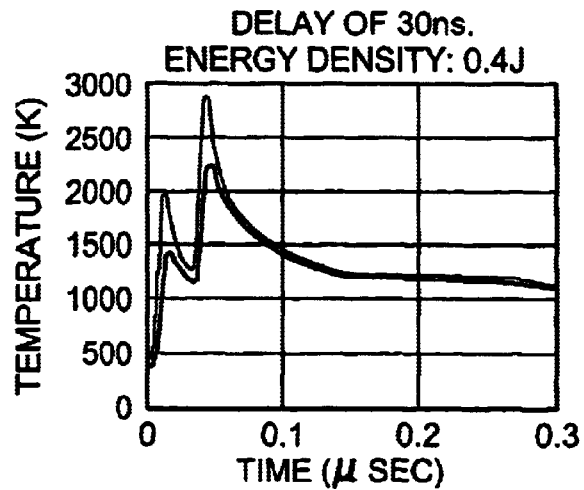
Figure 12:
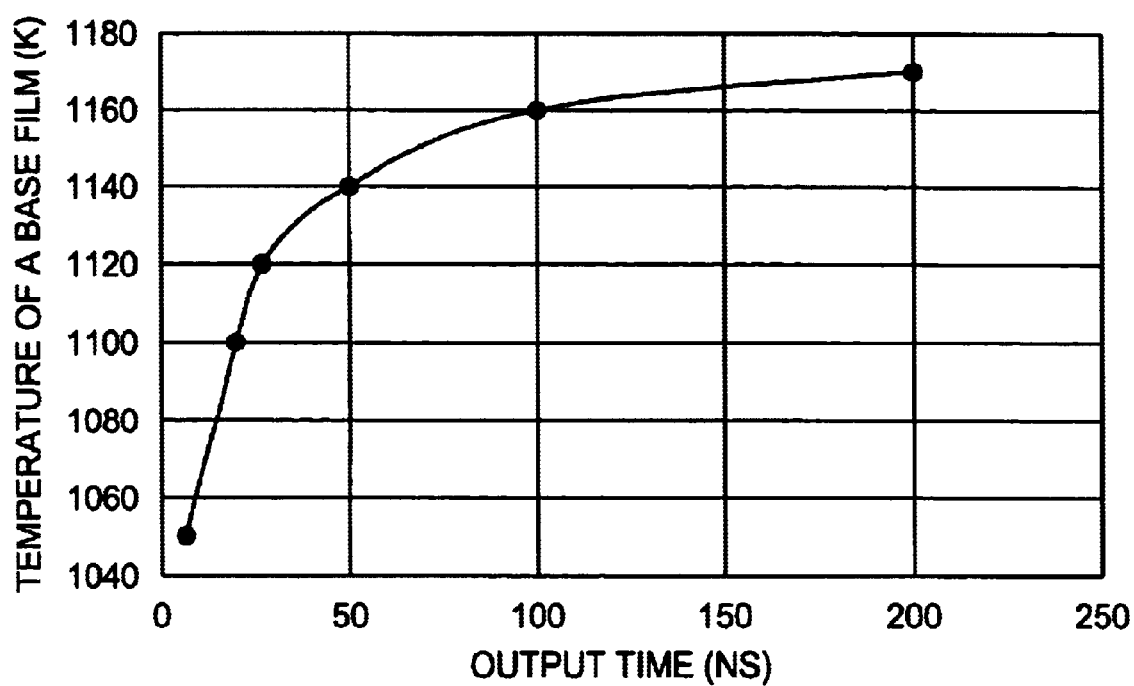
FIG. 12 is a diagram showing temperature changes of a base film as crystallization of a semiconductor film begins, versus the output time of a YAG laser.

The pulse shape of the laser light emitted from the laser oscillators is shown in FIG. 8A. The pulse shown by FIG. 8A is divided into two, and pulse shapes having delays of 10, 20, and 30 ns are as shown in FIGS. 8B to 8D, respectively. Calculations were performed with the second harmonics of the YAG laser with the pulse shapes shown by FIGS. 8B to 8D irradiated to a silicon film with the structure shown in FIG. 3, and temperature versus time was found for the points A to C of FIG. 3. The energy density was set from 0.2 to 0.4 J here. Results are shown in FIGS. 10A to 10C, FIGS. 10D to 10F, and in FIGS. 11A to 11C. Note that, for comparison, simulation results for time versus temperature at the points A to C of FIG. 3 are shown for the second harmonic of the YAG laser, having the pulse shape shown in FIG. 8A, irradiated to the silicon film having the structure shown in FIG. 3. The energy density was varied from 0.05 to 0.4 J here. The crystallization time and the melting time are short, and in particular, in the condition with low energy density, the temperature of the point C does not follow changes in the temperature of point A in FIGS. 9A to 9F. However, as shown in FIGS. 10A to 10F and 11A to 11C, it can be seen that there is a tendency for the crystallization time and the melting time to become longer along with lengthening delay time. In other words, the cooling speed becomes slower by So delaying, and then irradiating, one pulse after irradiation of the other pulse. The density of generated crystal nuclei therefore becomes lower, and the crystallization time becomes longer, and crystal grains having large size can be formed.

Note that although the two laser lights are formed so as to have the same strengths in embodiment 1, of course they may also be different. After irradiating the p components of the laser light on the semiconductor film in embodiment 1, the s components of the laser light, which have a light path length made longer by the reflective mirrors 111 to 114, are then irradiated to the semiconductor film. If the p components of the laser light are stronger than the s components, it is preferable to irradiate the s components of the laser light before the semiconductor film melted by the p components of the laser light begins to crystallize. Further, if the strength of the p components of the laser light are weaker than the s components of the laser light, it is preferable that the semiconductor film melt after the s components of the laser light be irradiated.

Embodiment 2

An embodiment differing from embodiment 1 is explained in embodiment 2. An example of a laser irradiation apparatus using a plurality of laser oscillators is shown in embodiment 2.

FIG. 2 is a diagram showing an example of a structure of a laser irradiation apparatus of the present invention. The laser irradiation apparatus has the laser oscillators 121a and 121b, the reflective mirrors 122, 124, and 125, the TFP 123, and the optical system 126 for processing laser light into a linear shape. Two YAG lasers are used as the laser oscillators in embodiment 2.

Laser light is emitted at the same time from the laser oscillators 121a and 121b. Although not shown in the figure, by using a TFP, the first laser light 1 emitted from the laser oscillator 121a is made to have only s components, and the second laser light 2 emitted form the laser oscillator 121b is made to have only p components. The laser light 1 is reflected by the reflective mirror 122, after which it arrives at the TFP 123. The laser light 2, on the other hand, arrives at the TFP 123 without going by way of reflective mirrors and the like. A light path difference is thus formed between the laser light 1 and the laser light 2 in accordance with the distance between the reflective mirror 122 and the TFP 123. A difference in time required to reach a substrate develops, and the cooling speed of a semiconductor film becomes slower. The density of crystal nuclei that develop therefore becomes lower, and the crystallization time becomes longer, and large size crystal grains can be formed. Furthermore, the light path difference between the laser lights emitted from the laser oscillators 121a and 121b can be arbitrarily changed by changing the distance between the reflective mirror 122 and the TFP 123.

In addition, there is also a method for oscillating the laser oscillator 121a, for example, after oscillating the laser oscillator 121b, when emitting laser light from the laser oscillators 121a and 121b. Compared to having simultaneous laser light emission from the laser oscillators 121a and 121b, light path differences between the reflective mirror 122 and the TFP 123 need not be formed with this method, resulting in a compact laser irradiation apparatus.

Embodiment 3

An example of a laser irradiation apparatus combining embodiment 1 and embodiment 2 is shown in embodiment 3.

FIG. 13 is a diagram showing an example of a structure of a laser irradiation apparatus of the present invention. The laser irradiation apparatus has solid state laser oscillators 131a and 134b, reflective mirrors 132, 138, 139, and 141 to 144, a $\bar{e}/2$ plate 135, thin film polarizers (TFPs) 133, 136, 137, and an optical system 140 for processing laser light into a linear shape. Further, reference numeral 134 denotes the energy monitor system, and reference numeral 145 denotes a shutter system. Two YAG lasers are used as the solid state laser oscillators in embodiment 3.

Laser light is emitted at the same time from the laser oscillators 131a and 131b. Although not shown in the figure, by using a TFP, the first laser light 1 emitted from the laser oscillator 131a is made to have only s components, and the second laser light 2 emitted form the laser oscillator 131b is made to have only p components. The laser light 1 is reflected by the reflective mirror 132, after which it arrives at the TFP 133. The laser light 2, on the other hand, arrives at the TFP 133 without going by way of reflective mirrors and the like. A light path difference is thus formed between the laser light 1 and the laser light 2 in accordance with the distance between the reflective mirror 132 and the TFP 133, and a difference in time for reaching the substrate develops.

Provided that the TFP 136 is arranged so that the angle of incidence of the laser light becomes the Brewster angle, the amount of reflected light from the laser light having p components, becomes zero (components in which the electric field vector oscillates within the plane of incidence). The p components of the laser light therefore pass through the TFP, and only the s components of the laser light (components in which the electric field vector oscillates within a plane vertical to the plane of incidence) are reflected. The p components of the transmitted laser light are irradiated on a substrate via the reflective mirrors 138 and 139, and the optical system 140.

On the other hand, the s components of the reflected laser light are reflected by the TFP 137, arranged so that the angle of incidence becomes the Brewster angle, after passing through the reflective mirrors 141 to 144, and are irradiated to the substrate via the reflective mirrors 138 and 139, and the optical system 140. By passing through the reflective mirrors 141 to 144, only the s components of the laser light have a light path length that becomes lengthened, and a light path difference with the p components of the laser light which pass through the TFP 136 is formed.

A difference in time for the laser lights arriving at the substrate therefore develops in embodiment 3 due to the light path difference caused by the distance between the reflective mirror 132 and the TFP 133, and by the light path difference due to the reflective mirrors 141 to 144, and the cooling speed of the semiconductor film can be made slower. The density of crystal nuclei that develop consequently becomes less, and the crystallization time becomes longer, and therefore crystal grains having a large grain size can be formed.

In addition to improving throughput by forming laser light into a linear shape when irradiating the laser light, an improvement in throughput, greater than that of laser irradiation using a conventional excimer laser, can also be achieved in accordance with the present invention by using a solid state laser which is easy to maintain.

Additionally, it is possible to obtain a crystalline semiconductor film having crystal grains whose size is in the same order as, or greater than, conventional grains (cases of irradiating excimer laser light). This is achieved by performing laser irradiation using a structure in which a difference in time is formed in laser lights, which are then irradiated to the semiconductor film.

What is claimed is:

1. A laser irradiation apparatus comprising:
a pulse emission solid state laser;
a first thin film polarizer, the first thin film polarizer dividing a laser light emitted from the pulse emission solid state laser into at least first and second laser lights, wherein the first laser light is reflected by the first thin film polarizer, and the second laser light pass through the first thin film polarizer;
a mirror, wherein the first laser light reflected by the first thin film polarizer is reflected by the mirror; and
a second thin film polarizer, wherein the first and second laser lights are combined at the second thin film polarizer,
wherein the light path length of the first laser light between the first and second thin film polarizers is longer than that of the second laser light.

2. A laser irradiation apparatus according to claim 1, wherein the first laser light is s components and the second laser light is p components.

3. A laser irradiation apparatus according to claim 1, wherein the output time of the laser light is from 1 to 50 ns.

4. A laser irradiation apparatus according to claim 1, wherein the pulse emission solid state laser is one type of laser chosen from the group consisting of a YAG laser; a YLF laser, a $YVO_4$ laser, and a $YAlO_3$ laser.

5. A laser irradiation apparatus comprising:
a pulse emission solid state laser;
a first thin film polarizer, the first thin film polarizer dividing a laser light emitted from the pulse emission solid state laser into at least first and second laser lights, wherein the first laser light is reflected by the first thin film polarizer, and the second laser light pass through the first thin film polarizer;
a mirror, wherein the first laser light reflected by the first thin film polarizer is reflected by the mirror;
a second thin film polarizer, wherein the first and second laser lights are combined at the second thin film polarizer;
an optical system, wherein the first and second laser lights pass through the optical system; and
a shutter provided between the second thin film polarizer and the optical system,
wherein the light path length of the first laser light between the first and second thin film polarizers is longer than that of the second laser light.

6. A laser irradiation apparatus according to claim 5, wherein the first laser light is s components and the second laser light is p components.

7. A laser irradiation apparatus according to claim 5, wherein the output time of the laser light is from 1 to 50 ns.

8. A laser irradiation apparatus according to claim 5, wherein the pulse emission solid state laser is one type of laser chosen from the group consisting of a YAG laser; a YLF laser, a $YVO_4$ laser, and a $YAlO_3$ laser.

9. A laser irradiation apparatus comprising:
a first pulse emission solid state laser emitting a first laser light;
a second pulse emission solid state laser emitting a second laser light;
a first mirror, wherein the first laser light is reflected by the first mirror;
a first thin film polarizer, wherein the first laser light is reflected by the first thin film polarizer, and the second laser light passes through the first thin film polarizer;
a second thin film polarizer, wherein the first laser light is reflected by the second thin film polarizer, and the second laser light pass through the second thin film polarizer;
a second mirror, wherein the first laser light is reflected by the second mirror; and
a third thin film polarizer, wherein the first laser light is reflected by the third thin film polarizer, and the second laser light pass through the first thin film polarizer.

10. A laser irradiation apparatus according to claim 9, wherein the first laser light is s components and the second laser light is p components.

11. A laser irradiation apparatus according to claim 9, wherein the output time of each of the first and second laser lights is from 1 to 50 ns.

12. A laser irradiation apparatus according to claim 9, wherein each of the first and second pulse emission solid state lasers is one type of laser chosen from the group consisting of a YAG laser; a YLF laser, a $YVO_4$ laser, and a $YAlO_3$ laser.

13. A laser irradiation apparatus according to claim 9, wherein the light path length of the first laser light between the first pulse emission solid state laser and first thin film polarizer is longer than that of the second laser light between the second pulse emission solid state laser and first thin film polarizer.

14. A laser irradiation apparatus comprising:
a first pulse emission solid state laser emitting a first laser light;
a second pulse emission solid state laser emitting a second laser light;
a first mirror, wherein the first laser light is reflected by the first mirror;
a first thin film polarizer, wherein the first laser light is reflected by the first thin film polarizer, and the second laser light passes through the first thin film polarizer;
a second thin film polarizer, wherein the first laser light is reflected by the second thin film polarizer, and the second laser light pass through the second thin film polarizer;
a second mirror, wherein the first laser light is reflected by the second mirror;
a third thin film polarizer, wherein the first laser light is reflected by the third thin film polarizer, and the second laser light pass through the first thin film polarizer;
an optical system, wherein the first and second laser lights pass through the optical system; and
a shutter provided between the third thin film polarizer and the optical system.

15. A laser irradiation apparatus according to claim 14, wherein the first laser light is s components and the second laser light is p components.

16. A laser irradiation apparatus according to claim 14, wherein the output time of each of the first and second laser lights is from 1 to 50 ns.

17. A laser irradiation apparatus according to claim 14, wherein each of the first and second pulse emission solid state lasers is one type of laser chosen from the group consisting of a YAG laser; a YLF laser, a $YVO_4$ laser, and a $YAlO_3$ laser.

18. A laser irradiation apparatus according to claim 14, wherein the light path length of the first laser light between the first pulse emission solid state laser and first thin film polarizer is longer than that of the second laser light between the second pulse emission solid state laser and first thin film polarizer.

19. A laser irradiation apparatus comprising:

a first pulse emission solid state laser emitting a first laser light;

a second pulse emission solid state laser emitting a second laser light;

a first mirror, wherein the first laser light is reflected by the first mirror;

a first thin film polarizer, wherein the first laser light is reflected by the first thin film polarizer, and the second laser light passes through the first thin film polarizer;

a second thin film polarizer, wherein the first laser light is reflected by the second thin film polarizer, and the second laser light pass through the second thin film polarizer;

a second mirror, wherein the first laser light is reflected by the second mirror; and a third thin film polarizer, wherein the first laser light is reflected by the third thin film polarizer, and the second laser light pass through the first thin film polarizer, wherein the light path length of the first laser light between the second and third thin film polarizers is longer than that of the second laser light between the second and third thin film polarizers.

20. A laser irradiation apparatus according to claim 19, wherein the first laser light is s components, and the second laser light is p components.

21. A laser irradiation apparatus according to claim 19, wherein the output time of each of the first and second laser lights is from 1 to 50 ns.

22. A laser irradiation apparatus according to claim 19, wherein each of the first and second pulse emission solid state lasers is one type of laser selected from the group consisting of a YAG laser; a YLF laser, a $YVO_4$ laser, and a $YAlO_3$ laser.

23. A laser irradiation apparatus according to claim 19, wherein the light path length of the first laser light between the first pulse emission solid state laser and first thin film polarizer is longer than that of the second laser light between the second pulse emission solid state laser and first thin film polarizer.

* * * * *